US 11,469,610 B2

(12) United States Patent
Budzen

(10) Patent No.: US 11,469,610 B2
(45) Date of Patent: Oct. 11, 2022

(54) CHARGING SYSTEM HAVING AN ACCUMULATOR, USE OF AN MPP TRACKING METHOD FOR CHARGING AN ACCUMULATOR, AND METHOD FOR CHARGING AN ACCUMULATOR WITH THE AID OF A CHARGING SYSTEM

(71) Applicant: SEW-EURODRIVE GMBH & CO. KG, Bruchsal (DE)

(72) Inventor: Harald Budzen, Landau (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 293 days.

(21) Appl. No.: 14/898,326

(22) PCT Filed: May 5, 2014

(86) PCT No.: PCT/EP2014/001190
§ 371 (c)(1),
(2) Date: Dec. 14, 2015

(87) PCT Pub. No.: WO2014/198362
PCT Pub. Date: Dec. 18, 2014

(65) Prior Publication Data
US 2016/0164340 A1 Jun. 9, 2016

(30) Foreign Application Priority Data
Jun. 12, 2013 (DE) .............. 10 2013 009 808.4

(51) Int. Cl.
*H02J 7/35* (2006.01)
*H02J 3/38* (2006.01)
(Continued)

(52) U.S. Cl.
CPC ............ *H02J 7/35* (2013.01); *H02J 3/383* (2013.01); *H02M 7/04* (2013.01); *H02M 7/44* (2013.01); *Y02E 10/56* (2013.01)

(58) Field of Classification Search
CPC ........................................ H02J 7/35
See application file for complete search history.

(56) References Cited

U.S. PATENT DOCUMENTS 6,437,996 B1 * 8/2002 Wobben .......... H02J 3/36
363/37
2004/0189251 A1 * 9/2004 Kutkut .......... H02J 7/022
320/128
(Continued)

FOREIGN PATENT DOCUMENTS

CN 102170150 A 8/2011
CN 102215012 A 10/2011
(Continued)

OTHER PUBLICATIONS

WO2013168474 Translation, Tsukamoto, Mar. 2013 Power Control Device and Power Control Method.*
(Continued)

*Primary Examiner* — Drew A Dunn
*Assistant Examiner* — Tynese V McDaniel
(74) *Attorney, Agent, or Firm* — Carter, DeLuca & Farrell LLP

(57) ABSTRACT

A charging system including an accumulator, a use of an MPP tracking method for charging an accumulator, and a method for charging an accumulator with the aid of a charging system, the charging system including a voltage source, a converter, and a rectifier, the current supplied and/or driven by the voltage source being supplied to the DC-voltage-side terminal of a converter, the converter having semiconductor switches, which are controllable in a pulse-width modulated manner, in order to generate an
(Continued)

output-side AC voltage, the output-side AC voltage feeding a rectifier, whose output-side voltage, especially rectified voltage, functioning and/or acting as charging voltage for the accumulator, an arrangement for detecting the output current of the inverter being situated in the converter, the effective value of the output current in particular corresponding to the charge current of the converter, a current limiting arrangement of the converter limiting the output current of the inverter to a current value such that the charging power, i.e., the product of charging voltage and charge current, is controlled toward a maximum value.

24 Claims, 3 Drawing Sheets

(51) Int. Cl.
*H02M 7/04* (2006.01)
*H02M 7/44* (2006.01)

(56) References Cited

U.S. PATENT DOCUMENTS

| | | | |
|---|---|---|---|
| 2006/0132102 A1* | 6/2006 | Harvey | G05F 1/67 320/166 |
| 2008/0192510 A1* | 8/2008 | Falk | H02J 3/387 363/17 |
| 2011/0043160 A1 | 2/2011 | Serban | |
| 2011/0089886 A1 | 4/2011 | Dubovsky | |
| 2011/0141773 A1* | 6/2011 | Larsen | H02J 3/36 363/35 |
| 2011/0148195 A1 | 6/2011 | Lee | |
| 2011/0210694 A1 | 9/2011 | Uehashi et al. | |
| 2011/0227525 A1 | 9/2011 | Blackall et al. | |
| 2011/0232714 A1 | 9/2011 | Bhavaraju et al. | |
| 2012/0138123 A1* | 6/2012 | Newdoll | F24J 2/461 136/246 |
| 2012/0293021 A1* | 11/2012 | Teggatz | H02J 7/35 307/151 |
| 2013/0193276 A1* | 8/2013 | Hunter | B61L 25/025 246/122 R |
| 2013/0328397 A1* | 12/2013 | Lee | H02J 3/32 307/23 |
| 2014/0334190 A1* | 11/2014 | Zhang | H02M 3/33507 363/17 |
| 2015/0015179 A1 | 1/2015 | Yamada et al. | |
| 2015/0077063 A1* | 3/2015 | Tsukamoto | H02S 50/00 320/134 |

FOREIGN PATENT DOCUMENTS

| | | | | |
|---|---|---|---|---|
| CN | 102237826 A | | 11/2011 | |
| DE | 10 2011 107 269 | | 1/2013 | |
| JP | 2003-9537 | | 1/2003 | |
| JP | 2003009537 | * | 1/2003 | ............... H02J 7/12 |
| JP | WO2013168474 | * | 3/2013 | ............... H02J 7/00 |
| WO | 2013/136852 | | 9/2013 | |

OTHER PUBLICATIONS

JP 2003009537 translartion Ichinose,Jan. 2003, Ichinose.*
"Basics of Maximum power point tracking" Leonics.*
"What is Maximum power point tracking" Northern Arizona Wind and Sun.*
International Preliminary Report on Patentability, dated Dec. 15, 2015, issued in corresponding International Application No. PCT/EP2014/001190.
International Search Report, dated Aug. 20, 2014, issued in corresponding International Application No. PCT/EP2014/001190.
Zhang et al., "Maximum Power Point Tracking For Resonant Inverters Based On Iteration Technique," U.S. Appl. No. 61/820,295, filed May 7, 2013.

* cited by examiner

A maximum power point
tracking method for
charging an accumulator
100

Charging the accumulator by an inverter that is actuated in a
pulse-width modulated manner and supplied from a DC
voltage source
101

Limiting an output current of the inverter to a current value
such that a charging power is controlled toward a maximum
value
102

FIG. 2

```
┌─────────────────────────────────────────────────┐
│         A method for charging an accumulator    │
│         with the aid of a charging system that  │
│              includes a DC voltage source, a    │
│                 converter, and a rectifier      │
│                          200                    │
│  ┌───────────────────────────────────────────┐  │
│  │ Supplying a DC current that is one of     │  │
│  │ supplied and driven by the DC voltage     │  │
│  │ source to a DC-voltage-side terminal of   │  │
│  │ an inverter                               │  │
│  │                   201                     │  │
│  └───────────────────────────────────────────┘  │
│                                                 │
│  ┌───────────────────────────────────────────┐  │
│  │ Actuating semiconductor switches of the   │  │
│  │ inverter in a pulse-width modulated       │  │
│  │ manner in order to generate an output-    │  │
│  │ side alternating voltage of the inverter  │  │
│  │                   202                     │  │
│  └───────────────────────────────────────────┘  │
│                                                 │
│  ┌───────────────────────────────────────────┐  │
│  │ Rectifying the output-side alternating    │  │
│  │ voltage, wherein the output-side rectified│  │
│  │ voltage at least one of functioning and   │  │
│  │ acting as a charging voltage for the      │  │
│  │ accumulator                               │  │
│  │                   203                     │  │
│  └───────────────────────────────────────────┘  │
│                                                 │
│  ┌───────────────────────────────────────────┐  │
│  │    Detecting an output current of the     │  │
│  │                 inverter                  │  │
│  │                   204                     │  │
│  └───────────────────────────────────────────┘  │
│                                                 │
│  ┌───────────────────────────────────────────┐  │
│  │ Limiting the output current of the        │  │
│  │ inverter to a current value such that a   │  │
│  │ charging power is controlled, by maximum  │  │
│  │ power tracking, toward a maximum value    │  │
│  │                   205                     │  │
│  └───────────────────────────────────────────┘  │
└─────────────────────────────────────────────────┘
```

FIG. 3

CHARGING SYSTEM HAVING AN ACCUMULATOR, USE OF AN MPP TRACKING METHOD FOR CHARGING AN ACCUMULATOR, AND METHOD FOR CHARGING AN ACCUMULATOR WITH THE AID OF A CHARGING SYSTEM

FIELD OF THE INVENTION

The present invention relates to a charging system having an accumulator, to a use of an MPP tracking system for charging an accumulator, and a method for charging an accumulator with the aid of a charging system.

BACKGROUND INFORMATION

It is generally known that a DC voltage is able to be supplied in photovoltaic systems with the aid of solar modules. An accumulator can be used for buffering the energy source thus provided, and a charging device is able to be employed when charging an accumulator.

SUMMARY

The present invention is therefore based on the objective of further developing an energy storage system.

Important features of the present invention in the charging system having an accumulator are that the charging system has a voltage source, a converter, and a rectifier, the current supplied and/or driven by the voltage source is supplied to the terminal of an inverter on the DC-voltage side, the inverter has semiconductor switches, which are actuable in a pulse-width modulated manner in order to generate an AC voltage on the output side, the output-side AC voltage feeds a rectifier, whose output-side voltage, in particular rectified voltage, on the output side functions and/or acts as charging voltage for the accumulator, a means for detecting the output current of the inverter is situated in the converter, and the effective value of the output current in particular corresponds to the charge current of the converter, the output-side AC voltage as the controlled variable is made known to the controller, in particular detected directly or indirectly, a current limiting means of the converter limits the output current of the inverter to a current value such that the charging power, i.e., the product of the charging voltage and charge current, is controlled toward a maximum value, in particular a current limiting means of the converter limiting the output current of the inverter to a current value, and an MPP tracker of the signal electronics of the converter sets this value such that the charging power, i.e., the product of charging voltage and charge current, is regulated toward a maximum value.

This has the advantage that a drive converter of the type commonly used in the industry, in particular a voltage-controlled converter for the supply of a three-phase AC motor, may be used as a charge control device for the accumulator. This is so because the output voltage of the converter is set to the value required as charging voltage, and the output current of the converter is acquired. The charging power that is ascertainable in this manner is controlled to a maximum value with regard to a current value that is predefined as the current limiting value by the signal electronics.

The current limiting value is increased or decreased in small steps and the charge power then arising is ascertained. The respective next current limiting value is then selected in such a way that the current limiting value is changed to a value such that the output attains its maximum value or at least comes very close to this maximum value.

It is furthermore advantageous that charging of the accumulator is possible even when the voltage at the direct voltage-side terminal of the inverter is lower than the charging voltage. This is achieved by providing corresponding inductances.

In one advantageous development, the voltage source is a solar module or a solar module system, and the DC voltage supplied by the voltage source is supplied to the intermediate circuit of the frequency converter. This is advantageous insofar as the control to the maximum value of the charging power is able to be undertaken by the converter; in other words, there is no need to detect the output current and the output voltage of the voltage source directly. As a result, using a drive converter commonly utilized for electric motors in the industry, it is possible to also implemented an optimized charge control for an accumulator since the acquisition of the output current and the ascertainment of the output voltage are integrated in the converter and the charge control can therefore be carried out without special extra effort. A novel use is therefore possible for a drive converter, i.e., as a charge controller for an accumulator.

In one advantageous development, the voltage source is a generator, and the AC voltage supplied by the voltage source feeds a rectifier of the frequency converter, whose DC-output feeds the intermediate circuit of the frequency converter. This has the advantage that a charge control of the accumulator by means of a drive converter can be realized for a wind power system as well.

In one advantageous development, the alternating voltage is a three-phase voltage, and each rectifier is developed as a rectifier for a three-phase voltage. This has the advantage that a rectified voltage, which drops as little as possible, is available to the accumulator as charging voltage at high currents.

In one advantageous development, a means for ascertaining the charging voltage is provided, especially at the accumulator, or the output voltage is determined from the intermediate circuit voltage and the pulse width modulation ratio, and/or a means for ascertaining the voltage at the DC-voltage-side terminal of the inverter, together with a means for ascertaining the pulse width modulation ratio is acting as means for ascertaining the charging voltage, in particular by ascertaining the charging voltage from the voltage at the DC-voltage-side terminal and the pulse-width modulation ratio, especially by multiplication. This has the advantage that the charging voltage can be ascertained in an uncomplicated manner In one advantageous development, the output-side alternating voltage of the inverter is set to a value that corresponds to a predefined charging voltage value. This has the advantage that a value which is optimal for charging the accumulator is able to be set.

In one advantageous development, the charging voltage is higher than the voltage applied at the DC-voltage-side terminal of the inverter. This has the advantage that corresponding inductivities may be provided and a voltage adaptation is able to be carried out even without any particular effort. An output filter having correspondingly situated inductances is preferably provided for this purpose.

Important features in the use of an MPP tracking method for charging an accumulator are that the accumulator is charged by an inverter which is controlled in a pulse-width modulated manner and supplied from a voltage source, the output current of the inverter being limited to a current value such that the charging power, i.e., the product of charging voltage and charge current, is controlled toward to maximum value, in particular with regard to the current value, in particular when a drop below said current limit occurs, the output voltage of the inverter is set in such a way that the accumulator is supplied from the provided charging voltage, the charging voltage in particular being generated by a rectification and filtering of the output voltage of the inverter.

This has the advantage that a drive converter can be used for regulating the rotational frequency of an electric motor so as to regulate the charging in an accumulator charging system supplied via a photovoltaic system. To do so, the converter merely requires the detection of the output current, which is undertaken anyway in a drive converter, and the ascertainment of the output voltage. The voltage detection is carried out directly at the output or directly at the intermediate circuit of the converter, i.e., at the direct-voltage-side terminal of the inverter. In the latter case, the acquired voltage value must be converted, taking into account the individual pulse width modulation ratio of the control signal for the semiconductor switches of the inverter.

Important features in the method for charging an accumulator by means of a charging system are that the charging system includes a voltage source, a converter, and a rectifier, the current supplied and/or driven by the voltage source is supplied to the DC-voltage-side terminal of an inverter, semiconductor switches of the inverter are actuated in a pulse-width modulated manner in order to generate an output-side alternating voltage of the inverter, the output-side alternating voltage is rectified, and the output-side, especially rectified, voltage functions and/or acts as charging voltage for the accumulator, the output current of the inverter is detected, in particular in the converter, the effective value of the output current in particular corresponding to the charge current of the converter, the output current of the inverter is limited to a current value such that the charging power, i.e., the product of charging voltage and charge current, is controlled toward to maximum value.

This has the advantage of allowing a novel use of a drive converter. In addition, the supplying photovoltaic system, especially the supplying solar module, is able to be utilized in an optimal manner.

Further advantages are derived from the dependent claims. The present invention is not restricted to the feature combination of the claims. Those skilled in the art will discover additional meaningful possibilities for combining claims and/or individual claim features and/or features of the specification and/or of the figures, that arise from the stated objective and/or the objective resulting from a comparison with the related art, in particular.

BRIEF DESCRIPTION OF THE DRAWINGS

FIG. 2 schematically illustrates a maximum power point tracking method for charging an accumulator, according to an example embodiment of the present invention.

FIG. 3 schematically illustrates a method for charging an accumulator with the aid of a charging system that includes a DC voltage source, a converter, and a rectifier, according to an example embodiment of the present invention.

DETAILED DESCRIPTION

Figure 1:
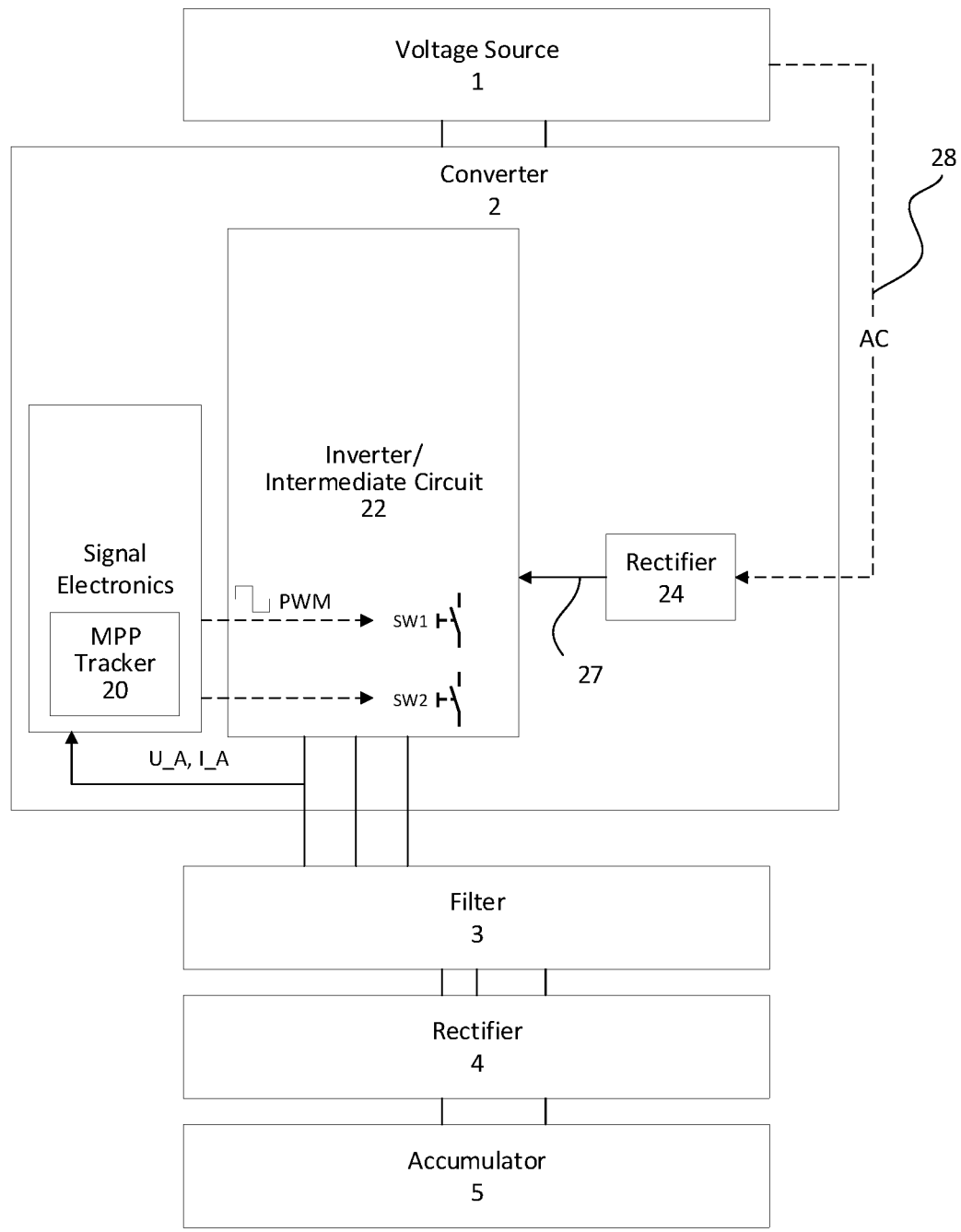
FIG. 1 illustrates a schematic structure of a system according to the present invention.

A solar module 1, in particular a photovoltaic module, supplies the DC-side supply of an inverter, in particular an intermediate circuit, of a frequency converter.

The inverter includes controllable semiconductor switches SW1, SW2, which are disposed in half-bridges, so that an AC voltage, in particular a three-phase voltage, is able to be generated on the output side, i.e., on its AC-side terminal Three half-bridges are provided, each being made up of two semiconductor switches which are switched in series. A signal electronics system generates pulse-width modulated control signals PWM, which are forwarded to the semiconductor switches. The pulse width modulation frequency preferably has a value between 1 kHz and 20 kHz. The generated AC voltage preferably is essentially sinusoidal.

Via a filter, especially including inductivities, the AC voltage generated by the inverter is supplied to a rectifier 4, from which an accumulator 5 can be fed.

As a result, the DC voltage generated by solar module 1 is convertible by an inverter 22, in particular by the semiconductor switches operated in a pulse-width modulated manner, into a three-phase voltage, which is supplied via filter 3 and via rectifier 4, to accumulator 5. The three-phase voltage is preferably sinusoidal, and the three phases of the three-phase voltage have a phase shift of approximately 120° or 240° with respect to each other.

After filtering, in particular low-pass filtering, by filter 3, and after rectification by rectifier 4, the voltage generated in this manner is used for charging accumulator 5.

The inverter is encompassed by a drive converter of the type conventionally used in the industry, which may be utilized for supplying an electric motor, in a use other than the previously described use as a charging device for an accumulator.

The inverter is provided in a housing of the frequency converter, in which the signal electronics of the frequency converter is disposed as well. The signal electronics also includes a regulator and/or controller. Thus, a value acquired by a sensor is also suppliable to the signal electronics, which controls the inverter as a function of this value.

The frequency converter is developed in such a way that the AC-voltage-side output voltage U_A and the current I_A emerging on the AC-voltage-side are acquired. Intermediate circuit voltage U_Z, i.e., the unipolar voltage, is detected in addition.

Moreover, the converter includes not only the inverter, but also a further rectifier 24, whose DC-side output could be used for supplying the intermediate circuit in the other use if an alternating current, in particular a three-phase current, is supplied to the rectifier at its AC-voltage-side terminal 28.

That is to say, if the converter were used as a drive converter, a supply of the AC-voltage-side terminal with an alternating current would be possible, especially an alternating voltage of the supply mains, such as the public supply mains, of 50 Hz or 60 Hz, for example. The AC voltage supplied in this manner would then be converted into a unipolar voltage by the rectifier and made available to the intermediate circuit, the semiconductor switches of the inverter being supplied from the intermediate circuit.

In an advantageous manner, the converter thus may be used either as a drive converter for feeding an electric motor, which is controllable in its rotational frequency in this way, or alternatively for the voltage conversion of a solar module 1 and/or a charge control of an accumulator.

In order to optimally utilize the output generated by solar module 1, output power P_A is determined in the signal electronics systems from the AC-voltage-side output voltage U_A detected at the frequency converter, and from current I_A emerging on the AC-voltage side, by multiplying the two detected values, that is, P_A=I_A*U_A.

The detection of output voltage U_A advantageously takes place by an ascertainment from the detected value of the intermediate circuit voltage and the individual current pulse width modulation ratio. In particular, the multiplication of the intermediate circuit voltage by the pulse width, i.e., the pulse control factor, results in a sufficiently precise value for the output voltage. In a further development, however, it is additionally also possible to use correction tables in order to enable a very precise correction of the ascertained value.

As an alternative, a voltage detection means ascertains output voltage U_A directly at the output of the converter or also at the terminal of accumulator 5.

The converter is able to set voltage values that lie between zero and the intermediate circuit voltage, i.e., the voltage applied at the DC-voltage-side terminal of the inverter. A three-phase voltage is advantageously provided on the output side at the inverter, which is then converted into the charge DC voltage by a rectifier. The energy store, i.e., especially the accumulator, is smoothing very effectively in the process. Nevertheless, it is possible to place a filter between the output of the inverter and the input of the rectifier, e.g., a power-line filter. Following the three-phase current rectification, the smoothing of a three-phase DC voltage system results in a sixfold higher residual AC voltage component, because the three-phase current rectification is carried out with the aid of a bridge rectifier that has three half-bridges of diodes. An extremely low ripple factor of the charging voltage is present as a consequence.

The signal electronics systems system actuates the semiconductor switches of the inverter by pulse-width modulated signals such that the output voltage corresponds to the charging voltage of the accumulator. A current limiting means of the signal electronics restricts the output current of the converter to the I_A value. The current limiting means is preferably provided in a controller of the signal electronics systems, whose output signal is the output voltage U_A to be set by the inverter.

While it is true that manipulated variable U_A is predefined for the voltage during the charging, current limit I_A has a restricting effect at the beginning of the charging operation when the energy store is not charged Manipulated variable U_A becomes significant only after the charging has progressed. As a result, current-controlled charging is able to be carried out at the start and voltage-controlled charging at the end, i.e., a CV process. As an alternative, a CC process can be carried out as well, which thus consists of different current-controlled processes only.

The signal electronics systems furthermore includes an MPP tracker. This MPP tracker specifies an individual current limiting value I_A to the current limiting means in each time segment, such that output P_A is controlled toward its maximum value. Depending on the solar module's exposure to sunlight, a control to the maximum output thus takes place by varying current limiting value I_A, and the accumulator thus achieves the maximally possible charging power for the accumulator.

The output-side alternating voltage of the inverter is set to a value that corresponds to a predefined charging voltage value, in particular a final charging voltage of the energy store, when the charge current drops below the current limiting value.

In other words, the MPP tracking is advantageously used in the charging of an accumulator 5. This has the advantage that the voltage conversion from the voltage generated by the solar module to the charging voltage of the accumulator need not be taken into account in the MPP tracking. In addition, a conventional drive converter can be used, because it is always the case in such a converter that the output voltage is set and the output current of the frequency converter is detected.

In one further exemplary embodiment according to the present invention, an additional current limiting means is provided in the signal electronics systems, which restricts output current I_A of the frequency converter to a maximum value which, when exceeded, would cause a destruction of the accumulator.

In one further exemplary embodiment according to the present invention, a generator of a wind power system generates an alternating voltage, which is supplied to the further rectifier the frequency converter. The further rectifier generates a unipolar voltage which is forwarded to the intermediate circuit, from which the inverter supplying the accumulator via filter 3 and rectifier 4 is supplied. As a result, the accumulator is also chargeable from a wind power system instead of a solar module.

According to an example embodiment of the present invention, a charging system includes: an accumulator 5; a DC voltage source 1; a converter 2 including an inverter 22; and a rectifier 4. A DC current at least one of supplied and driven by the DC voltage source 1 is supplied to a DC-voltage-side terminal of the inverter 22, the inverter 22 includes semiconductor switches SW1, SW2 that are controllable in a pulse-width modulated PWM manner for generating an output-side AC voltage, the output-side AC voltage feeds the rectifier 4 that produces a rectified output-side voltage that at least one of functions and acts as a charging voltage for the accumulator 5, the converter 2 is adapted to detect an output current of the inverter 22, an effective value of the output current corresponds to a charge current of the converter 2, the output-side AC voltage is a controllable variable. The converter 2 is adapted to limit the output current of the inverter 22 to a current value such that a charging power is controlled toward a maximum value, and the converter 2 includes a maximum power point (MPP) tracker 20 that sets the output current value such that the charging power is regulated toward a maximum value.

According to an example embodiment of the present invention, a charging system includes: an accumulator 5; a voltage source 1; a converter 2 including an inverter 22; and a rectifier 4. A current at least one of supplied and driven by the voltage source 1 is supplied to a DC-voltage-side terminal of the inverter 22, the inverter 22 includes semiconductor switches SW1, SW2 that are controllable in a pulse-width modulated PWM manner for generating an output-side AC voltage, the output-side AC voltage feeds the rectifier 4 that produces a rectified output-side voltage that at least one of functions and acts as a charging voltage for the accumulator 5, the converter 2 is adapted to detect an output current of the inverter 22, an effective value of the output current corresponds to a charge current of the converter 2, the output-side AC voltage is a controllable variable, the converter 2 is adapted to limit the output current of the inverter 22 to a current value such that a charging power is controlled toward a maximum value, the converter 2 includes a maximum power point (MPP) tracker 20 that sets the current value such that the charging power is regulated toward a maximum value, the voltage source 1 is a generator, and the AC voltage 28 supplied by the voltage source 1 a rectifier 24 of the converter 2, a DC-voltage-side output 27 of the converter 2 feeding inverter 22 of the converter 2.

Referring, for example, to FIG. 2, according to an example embodiment of the present invention, a maximum power point tracking method for charging an accumulator 100 includes: charging the accumulator by an inverter that is actuated in a pulse-width modulated manner and supplied from a DC voltage source 101; and limiting an output current of the inverter to a current value such that a charging power is controlled toward to a maximum value 102.

Referring, for example, to FIG. 3, according to an example embodiment of the present invention, a method for charging an accumulator with the aid of a charging system that includes a DC voltage source, a converter, and a rectifier 100 includes: supplying a DC current that is one of supplied and driven by the DC voltage source to a DC-voltage-side terminal of an inverter 201; actuating semiconductor switches of the inverter in a pulse-width modulated manner in order to generate an output-side alternating voltage of the inverter 202; rectifying the output-side alternating voltage, wherein the output-side rectified voltage at least one of functioning and acting as a charging voltage for the accumulator 203; detecting an output current of the inverter 204; and limiting the output current of the inverter to a current value such that a charging power is controlled, by maximum power point tracking, toward a maximum value 205.

The invention claimed is:
1. A charging system, comprising:
an accumulator;
a DC voltage source;
a converter including an inverter; and
a rectifier, wherein:
    a DC current at least one of supplied and driven by the DC voltage source is supplied to a DC-voltage-side terminal of the inverter,
    the inverter includes semiconductor switches that are controllable in a pulse-width modulated manner for generating an output-side AC voltage,
    the output-side AC voltage feeds the rectifier that produces a rectified output-side voltage that at least one of functions and acts as a charging voltage for the accumulator,
    the converter is adapted to detect an output current of the inverter,
    an effective value of the output current corresponds to a charge current of the converter,
    the output-side AC voltage is a controllable variable,
    the converter is adapted to limit the output current of the inverter to a current value such that a charging power is controlled toward a maximum value, and
    the converter includes a maximum power point tracker that sets the output current value such that the charging power is regulated toward a maximum value.
2. The charging system as recited in claim 1, wherein the output-side AC voltage is detected one of directly and indirectly.
3. The charging system as recited in claim 1, wherein the charging power is a product of the charging voltage and the charge current.
4. The charging system as recited in claim 1, wherein:
the output-side AC voltage is a three-phase voltage, and
the rectifier is developed as a rectifier for three-phase voltage.
5. The charging system as recited in claim 4, wherein the rectifier is a three-phase current bridge rectifier.
6. The charging system as recited in claim 1, further comprising:
an arrangement for ascertaining the charging voltage.
7. The charging system as recited in claim 6, wherein the arrangement for ascertaining is provided at the accumulator.
8. The charging system as recited in claim 1, further comprising:
an arrangement for ascertaining a voltage at the DC-voltage-side terminal of the inverter cooperates with an arrangement for ascertaining a pulse width modulation ratio.
9. The charging system as recited in claim 8, wherein the charging voltage is ascertained by multiplication from the voltage at the DC-voltage-side terminal and the pulse-width modulation ratio.
10. The charging system as recited in claim 1, wherein the output-side AC voltage of the inverter is set to a value that corresponds to a predefined charging voltage value when the charge current drops below a current limiting value.
11. The charging system as recited in claim 10, wherein the predefined charging voltage value is a final charging voltage of the accumulator.
12. The charging system as recited in claim 1, wherein the charge voltage is higher than a voltage applied at the DC-voltage-side terminal of the inverter.
13. A charging system, comprising:
an accumulator;
a DC voltage source;
a converter including an inverter; and
a rectifier, wherein:
    a DC current at least one of supplied and driven by the DC voltage source is supplied to a DC-voltage-side terminal of the inverter,
    the inverter includes semiconductor switches that are controllable in a pulse-width modulated manner for generating an output-side AC voltage,
    the output-side AC voltage feeds the rectifier that produces a rectified output-side voltage that at least one of functions and acts as a charging voltage for the accumulator,
    the converter is adapted to detect an output current of the inverter,
    an effective value of the output current corresponds to a charge current of the converter,
    the output-side AC voltage is a controllable variable,
    the converter is adapted to limit the output current of the inverter to a current value such that a charging power is controlled toward a maximum value,
    the DC voltage source is one of a solar module and a solar module system, and
    a DC voltage supplied by the DC voltage source is supplied to an inverter of the converter.
14. A charging system, comprising:
an accumulator;
a voltage source;
a converter including an inverter; and
a rectifier, wherein:
    a current at least one of supplied and driven by the voltage source is supplied to a DC-voltage-side terminal of the inverter,
    the inverter includes semiconductor switches that are controllable in a pulse-width modulated manner for generating an output-side AC voltage,
    the output-side AC voltage feeds the rectifier that produces a rectified output-side voltage that at least one of functions and acts as a charging voltage for the accumulator,
    the converter is adapted to detect an output current of the inverter,
    an effective value of the output current corresponds to a charge current of the converter,
    the output-side AC voltage is a controllable variable, the converter is adapted to limit the output current of the inverter to a current value such that a charging power is controlled toward a maximum value, the converter includes a maximum power point tracker that sets the current value such that the charging power is regulated toward a maximum value, the voltage source is a generator, and the AC voltage supplied by the voltage source feeds a rectifier of the converter, a DC-voltage-side output of the converter feeding an inverter of the converter.

15. A maximum power point tracking method for charging an accumulator, comprising:

charging the accumulator by an inverter that is actuated in a pulse-width modulated manner and supplied from a DC voltage source; and limiting an output current of the inverter to a current value such that a charging power is controlled toward to a maximum value.

16. The method as recited in claim 15, wherein the charging power is controlled to the maximum value with regard to the current value.

17. The method as recited in claim 15, further comprising:

setting an output voltage of the inverter in such a way that the accumulator is fed from a provided charging voltage if a charge current drops below a current limiting value.

18. The method as recited in claim 17, further comprising generating the charging voltage by rectification of the output voltage of the inverter.

19. The method as recited in claim 18, wherein the rectification includes filtering.

20. The method as recited in claim 15, wherein the charging power is a product of a charging voltage and a charge current.

21. A method for charging an accumulator with the aid of a charging system that includes a DC voltage source, a converter, and a rectifier, the method comprising:

supplying a DC current that is one of supplied and driven by the DC voltage source to a DC-voltage-side terminal of an inverter;

actuating semiconductor switches of the inverter in a pulse-width modulated manner in order to generate an output-side alternating voltage of the inverter;

rectifying the output-side alternating voltage, wherein the output-side rectified voltage at least one of functioning and acting as a charging voltage for the accumulator;

detecting an output current of the inverter; and limiting the output current of the inverter to a current value such that a charging power is controlled, by maximum power point tracking, toward a maximum value.

22. The method as recited in claim 21, wherein the converter includes the inverter.

23. The method as recited in claim 21, wherein an effective value of the output current corresponds to a charge current of the converter.

24. The method as recited in claim 21, wherein the charging power is a product of the charging voltage and a charge current of the converter.

* * * * *